United States Patent [19]

Allaire

[11] 4,312,457
[45] Jan. 26, 1982

[54] HOUSING STRUCTURES FOR EVACUATED DEVICES

[75] Inventor: Roger A. Allaire, Big Flats, N.Y.

[73] Assignee: Corning Glass Works, Corning, N.Y.

[21] Appl. No.: 123,681

[22] Filed: Feb. 22, 1980

[51] Int. Cl.$^3$ .............................................. H01J 5/03
[52] U.S. Cl. .................................. 220/2.1 R; 52/788;
220/2.1 A; 313/220
[58] Field of Search ................. 220/2.1 R, 2.1 A, 2.2;
313/220, 422, 477 R, 481, 493; 428/34; 52/788;
126/450

[56] References Cited

U.S. PATENT DOCUMENTS

| | | | |
|---|---|---|---|
| 1,124,778 | 1/1915 | Meuler | 52/788 |
| 2,089,567 | 8/1937 | Moffat | 313/220 x |
| 2,183,907 | 12/1939 | Fischer et al. | 52/788 X |
| 2,589,064 | 3/1952 | Drake | 52/788 |
| 2,708,774 | 5/1955 | Seelen | 428/34 |
| 3,222,153 | 12/1965 | Browne | 52/788 X |
| 3,851,785 | 12/1974 | Schulke | 220/2.2 |
| 4,205,252 | 5/1980 | Sinclair et al. | 313/422 |

FOREIGN PATENT DOCUMENTS 429751  6/1935  United Kingdom ................. 52/788

Primary Examiner—Stephen Marcus
Attorney, Agent, or Firm—Burton R. Turner

[57] ABSTRACT

In a flat panel display system including an enclosing housing structure having opposed front and back panels connected together by a plurality of hermetically sealed sidewall panels, which structure requires a subatmospheric or evacuated environment for the performance of the components contained therein resulting in the production of undesirable stresses in the opposed panels due to the forces generated by atmospheric pressure, the sidewall panels are formed with oblique panel portions lying skew to the opposed front and back panels and extending outwardly of the housing intermediate said opposed panels, and thereby reduce the maximum stresses generated in such front and back panels to within acceptable limits. The skew panels may be formed of glass and be of uniform thickness along their extent, or may be contoured so as to taper in thickness toward a center portion intermediate the front and back panels. In addition, the skew sidewall panels may be formed as a single unitary wall or as a plurality of panels sealed together intermediate the fornt and back panels.

8 Claims, 13 Drawing Figures

HOUSING STRUCTURES FOR EVACUATED DEVICES

BACKGROUND OF THE INVENTION

For sometime now, it has been the dream of the television set manufacturers to be able to commercially produce light weight large screen glass TV systems. However, in view of the fact that the electronic components of such systems require an evacuated environment, it has not been possible to produce such a large light weight flat panelled glass TV system which could withstand, within commercially acceptable maximum stress limits, the high atmospheric forces acting thereon. That is, when a relatively large shallow structure is evacuated, an atmospheric pressure of approximately one ton per square foot is exerted upon the enclosure structure, and if the base plate and face plate of such structure were about 8 square feet in area, then such plates would be subjected to a total atmospheric pressure of about 16 tons. Suitable supporting structures such as the supporting means shown in commonly assigned copending U.S. patent application Ser. No. 965,588, filed Dec. 1, 1978 and entitled Floating Vanes for Flat Panel Display System, provide sufficient support to prevent catastrophic failure of a glass housing, however, due to normal manufacturing tolerances the housing is still subjected to a degree of deformation and resulting stress which must be compensated for in order to maintain the maximum stress within commercially acceptable limits.

The present invention materially reduces the problems of high stress concentration which occur in conventional evacuated glass envelopes for rectangular flat panel display devices such as shown in U.S. Pat. Nos. 4,101,802 and 4,117,368, solar collectors such as shown in U.S. Pat. Nos. 3,995,615 and 4,038,965, and the like by utilizing skew wall panels within the housing structure to offset and minimize the effects of the atmospheric loading upon the evacuated housing structure.

SUMMARY OF THE INVENTION

In its simplest form, the present invention sets forth a completely new concept in providing support for a front or face plate panel and a back or base panel of a large evacuated solar collector, flat plate TV display system, or the like, so that the stresses generated in such opposed face plate and base plate by the forces exerted thereon by atmospheric pressure may be minimized and fall well within recognized commercially acceptable limits. The improvement within the envelope or housing structure resides in the fact that the sidewalls between the opposed front and back panels are formed with skew wall portions which are slanted and oblique with respect to the opposed front and back panels. In view of the fact that such skew wall portions project outwardly of the housing intermediate the opposed front and back panels, end portions of the oblique panel portions are offset with respect to each other within a plane extending perpendicular to at least one of said opposed panels. As a result of such offset, the maximum stress within a conventional glass rectangular flat panel display envelope or solar collector housing may be significantly reduced.

It thus has been an object of the present invention to obviate the problems of high stress concentrations in the prior art solar collector housings and rectangular flat panel display housings by providing sidewall panels having skew wall portions which are oblique to front and back panels of the housing such that end portions of such skew panel portions are offset within a plane passing between such front and back panels and lying perpendicular to at least portions of one of said panels.

DESCRIPTION OF THE PREFERRED EMBODIMENTS

Figure 1:
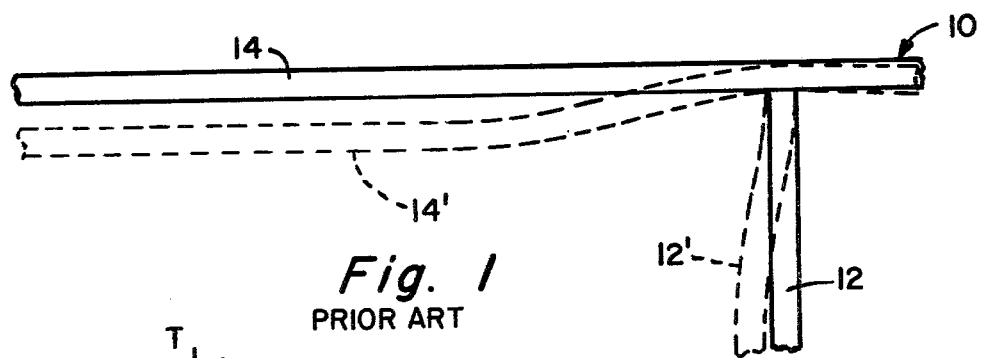
FIG. 1 is a fragmental schematic view showing a section of a conventional rectangular glass flat plate solar or display housing and illustrating in exaggeration the deformation which occurs when such housing is evacuated.
Figure 2:
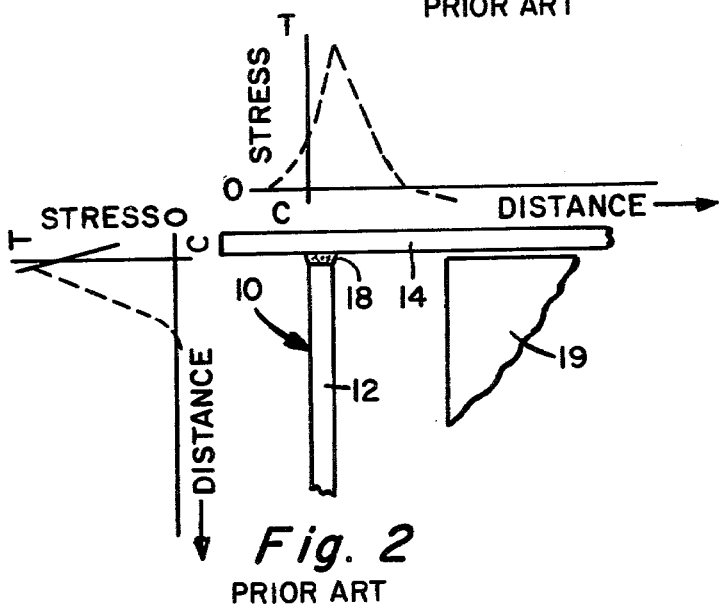
FIG. 2 is a schematic fragmental illustration of a conventional rectangular housing for a flat display device graphically illustrating the relative magnitude and location of surface stress produced within the housing panels when such housing is subjected to subatmospheric pressure.
Figure 3:
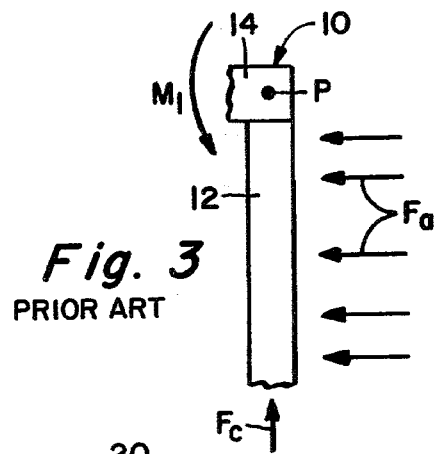
FIG. 3 is a schematic illustration of the atmospheric forces applied to the perpendicular sidewalls of a conventional rectangular flat plate solar or display device and a counterbalancing moment in the adjacent panel.

Referring now to FIGS. 1, 2 and 3, a portion of a conventional glass rectangular housing or envelope 10 for a solar collector or flat display device is shown having a conventional perpendicular sidewall 12 connected to a glass panel 14 such as a viewing faceplate or front panel. However, for purposes of illustration with respect to FIGS. 1-4, the front panel 14 could very well represent back panel 16 since both may be formed of glass and similar stresses are developed within the back panel. As shown particularly in FIG. 2, the sidewall panels 12 are secured to the front and back panels such as by frit sealing 18, and support vanes 19 of the previously mentioned prior art may be positioned within a flat panel display housing 10. When the housing 10 is evacuated, atmospheric pressure acting upon the sidewalls 12 and the front and back panels 14,16, causes such walls and panels to become distorted as shown in exaggerated form in dash lines of FIG. 1 as 12', and 14', respectively. In addition, the stress produced by such deformation is concentrated adjacent to the intersections of the walls 12 and panels 14,16 as shown in FIG. 2, wherein a high tensile stress is produced adjacent such intersections and rapidly declines to a compressive stress a short distance from such intersections.

Figure 4:
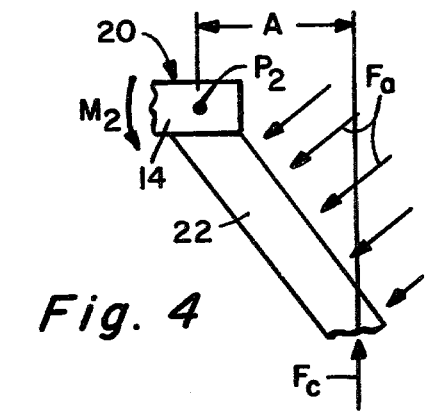
FIG. 4 is a schematic illustration of atmospheric forces applied to a skew wall panel of the present invention and a counterbalancing moment in an adjacent panel.

Referring now to FIGS. 3 and 4, the resulting moments necessary to counterbalance the effects of the forces of the atmospheric pressure acting upon the sidewalls of an evacuated housing having conventional perpendicular sidewalls, and an evacuated housing having skew sidewalls of the present invention, are shown. As the force of atmospheric pressure is applied perpendicularly to the outer surface of conventional perpendicular sidewall 12, as represented by arrows $F_a$ of FIG. 3, a rather large counterbalancing moment $M_l$ is produced about the point P at the junction of the panel 14 and sidewall 12, thus resulting in a rather large maximum stress concentration in the housing 10, particularly in view of the fact that the compressive force $F_c$ exerted on the end of the sidewall 12 by the evacuated structure passes directly through the corner P and thus does not effect the sum of the moments thereabout. However, in view of the fact that housing 20 of FIG. 4 has a skew sidewall 22, the compressive force $F_c$ of the evacuated housing acting through an outer portion of the skew wall, is offset from the corner $P_2$ at the juncture of skew wall 22 and panel wall 14 a distance represented by arrow A, so as to require a smaller counterbalancing moment arm around point $P_2$ which is counter to the atmospheric force as represented by arrows $F_a$ exerted perpendicularly to the outside surface of the skew sidewall 22, thus reducing the required counterbalancing moment $M_2$ over moment $M_1$ and accordingly reducing the maximum stress within the housing 20 over that within housing 10.

Figure 5:
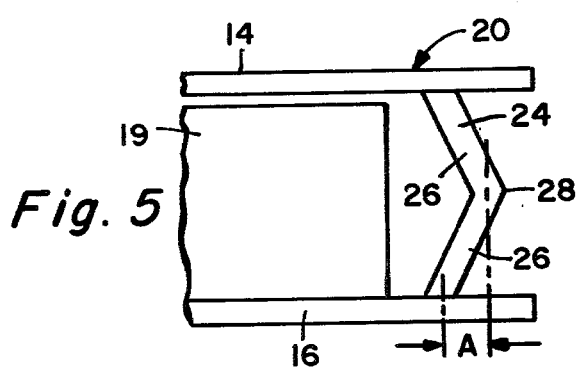
FIG. 5 is a fragmental schematic illustration of a glass flat panel structure embodying a uniform skew wall of the present invention.
Figure 13:
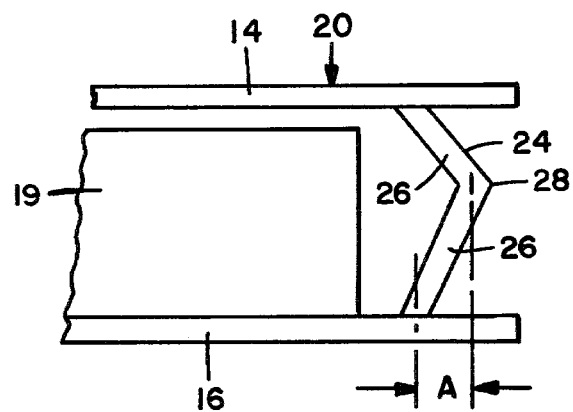
FIG. 13 is a fragmental schematic illustration of a flat panel housing embodying an asymetrical skew wall of the present invention.

The skew sidewall portions or panels of the present invention are preferably formed of glass-ceramic material and may be in various forms such as illustrated in FIGS. 5–9 inclusive. The skew sidewall 24 of housing 20 as shown in FIG. 5 and FIG. 13 is of unitary construction and has a uniform thickness throughout its extent, and further comprises a pair of oblique panel portions 26 which slant outwardly from opposed panels 14 and 16 and toward one another so that the outermost portion 28 of skew sidewall 24 is offset by a distance A with respect to the junction or connection of such skew panel portions with opposed front and back panels 14 and 16.

Figure 6:
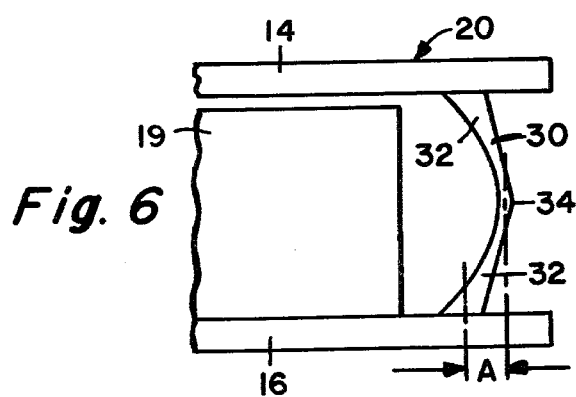
FIG. 6 is a fragmental schematic illustration of a flat panel housing embodying a contoured or tapered skew wall of the present invention.

In FIG. 6, the envelope or housing 20 is provided with a skew sidewall 30 of unitary construction having contoured or tapered oblique panel portions 32 extending outwardly from the opposed front back panels 14 and 16, such that its outermost portion 34 is offset a distance A with respect to the sealed juncture or connection of contoured panel portions 32 with the opposed panels 14 and 16.

Figure 7:
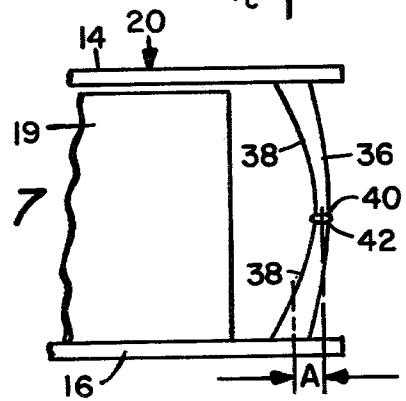
FIG. 7 is a fragmental schematic illustration of a glass housing or envelope for a flat panel device embodying a contoured or tapered skewed wall of the present invention formed from a plurality of skew wall portions sealed together intermediate opposed front and back panels of the housing.

In FIG. 7, the housing or envelope 20 is shown provided with a contoured or tapered skew sidewall 36, similar to contoured skew sidewall 30 of FIG. 6, but comprising a plurality of contoured or tapered oblique panels 38 hermetically sealed together at 40 intermediate front and back panels 14 and 16. Preferably such seal is in the form of a semi-flexible glass to metal seal such as disclosed in copending commonly assigned U.S. Patent Application Ser. No. 123,834 entitled Sealing Housing Structures for Evacuated Devices. In a manner similar to skew sidewalls 24 and 30, skew wall 36 has an outermost portion 42 which is offset a distance A from the juncture of the oblique panels 38 with opposed panels 14 and 16. Although only two oblique panels are shown in FIG. 7, additional panels may be utilized such that end portions of a plurality of oblique panels may be hermetically sealed to adjacent end portions of such panels intermediate the opposed front and back panels.

Figure 8:
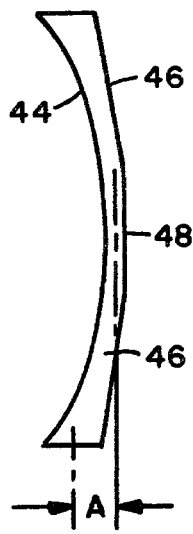
FIG. 8 is an illustration of a further embodiment of a skew wall structure of the present invention.

Referring now to FIG. 8, a unitary skew sidewall 44 is shown being composed of a pair of oblique panel portions 46 which are adapted to be hermetically sealed at their outer ends to opposed front and back panel portions, and a perpendicular panel portion positioned therebetween. The outermost portion of the sidewall 44 is represented by central perpendicular panel portion 48, and accordingly the skew sidewall 44 is provided with an offset distance A between outer ends of oblique panel portions 46 and central portion 48. As will be noted, the various offsets A are measured within a plane extending perpendicular to at least a portion of one of the opposed front and back panels, and is measured between a line lying in such plane and extending through the center of the thickness of the sidewall panel where it joins one of the opposed panels and a center line also lying within such plane and extending through the thickness of that portion of the skew sidewall extending outermost from the center of the housing. Although the slew sidewall 44 is shown as being of unitary construction, the various panel portions 46 and 48 could be formed individually and hermetically sealed together similar to the panels of skew sidewall 36 shown in FIG. 7.

Figure 9:
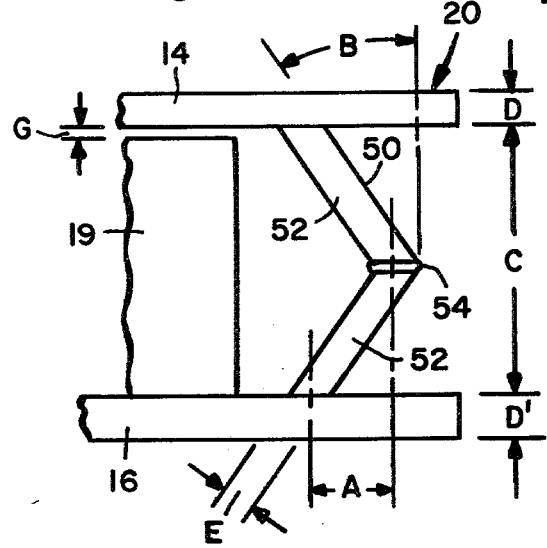
FIG. 9 is a somewhat schematic fragmental illustration of a flat panel glass housing embodying a uniform skew wall of the present invention formed from a plurality of skew wall portions sealed together intermediate the front and back panels of the housing and illustrating various physical components of the structure.

Referring now to FIG. 9. a uniform skew sidewall 50, similar to sidewall 24 of FIG. 5, is shown being formed from a pair of uniform oblique panels 52 hermetically sealed together at 54 intermediate opposed panels 14 and 16. The seal 54 is adjacent the outermost portion of the skew sidewall 50, and accordingly is outwardly offset a distance A from the juncture of oblique panels 52 with the opposed panels 14 and 16. Further, although only two such oblique panels are shown, additional oblique panels 52 may be utilized which are hermetically sealed together intermediate opposed panels 14 and 16 and have various oblique angles with respect to a line lying perpendicular to opposed panels 14 and 16.

Figures 10, 11:
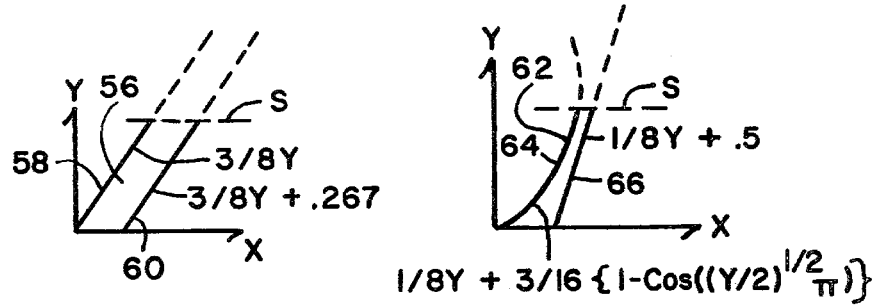
FIG. 10 is a graphic illustration of one form of the uniform skew wall embodying the present invention.
FIG. 11 is a graphic illustration of one form of a contoured or tapered skew wall embodying the present invention.

Although a variety of wall panels may be utilized in accordance with the present invention, FIGS. 10 and 11 specifically set forth a uniform skew wall structure and a contoured skew wall structure, respectively, which may be utilized in accordance with the present invention. As shown in FIG. 10, the uniform skew wall 56, which is shown in solid lines up to an axis of symmetry S and in dash lines thereabove, has an inner wall 58 defined by the mathematical function $\frac{3}{8} Y$ and an outer wall 60 defined by the mathematical function $\frac{3}{8} Y + 0.267$. Similarly, FIG. 11 shows a contoured skew wall 62 in solid lines up to an axis of symmetry S and dash lines thereabove, having an inner wall 64 defined by the mathematical function $\frac{1}{8}Y+3/16\,[1-\cos((Y/2-)\frac{1}{4}\pi)]$ and an outer wall 66 defined by the mathematical function $\frac{1}{8}Y+0.5$. Although the various skew wall panels represented in FIGS. 5–9 are all shown as being symmetrical about an axis of symmetry S between opposed front and back panels 14 and 16, respectively, such walls need not be symmetrical about such axis as shown in FIG. 13, however any asymmetry should not be more than about 30% of the distance between the opposed front and back panels as undesirable stress concentrations may develop.

Referring again to FIG. 9, various geometric or structural parameters are set forth in addition to the offset A representing the distance between the center line of the thickness of the skew wall panels adjacent the opposed panels and the center line of the thickness of the sidewall panel representing its outermost position relative to the center of the housing or envelope 20. The arrows B represent the offset or skew angle which the oblique sidewall panels of the skew sidewall make with a vertical plane extending perpendicular to at least a portion of one of said opposed panels 14 and 16. The offset angle B should be between about 1 degree and about 60 degrees. That is, as the offset angle approaches 0 degrees the resulting structure would be similar to a conventional rectangular structure as shown in FIGS. 1–3, whereas when the offset angle is increased much above 60 degrees, tensile stress on the inside of the sidewall panels becomes unduly high and the sidewall would have a tendency to break and collapse. For a configuration as shown in FIG. 9 with 0.15" thick walls of soda lime glass 4" high, an offset angle of between about 27° and 37° appeared acceptable, with preferred range of about 30° to 35°.

The distance represented by arrows C is the distance between the opposed front and back panels 14,16 respectively, and as previously mentioned asymmetry of the panel portions should not exceed about 30% of such distance. The distance C represents the width between the front and back panels, and may vary from about 0.002" to about 12". The lower limit would merely represent a boundary seal between the front and back walls, whereas the upper limit is limited by the unwieldly thickness of glass which would be required to withstand the pressures generated upon evacuation of the housing.

The thicknesses represented by arrows D and D' which are not necessarily equal, are the thicknesses of the front face plate and back plate 14,16 respectively, whereas the thickness E represents the skew wall thickness of either a uniform or contoured wall, all of which are preferably formed of vitreous material such as glass and frit sealed together as shown at 18 in FIG. 2. The thicknesses represented by the arrows D, D', and E should be between about 0.01" and about 0.5". The lower limit is predicated upon the fact that the various panels of the housing would not be able to withstand the pressures exerted thereon when the housing was evacuated, whereas the upper limit again relates to that which would produce a heavy unwieldly bulky housing. The skew sidewalls are shown as being joined to the opposed at a position which is inwardly of their periphery, however such sidewalls may be joined to such opposed panels at their peripheral edges if operating parameters are not affected. Further, the skew sidewalls are positioned adjacent each side edge about the periphery of the opposed panels and are hermetically sealed together at intersecting corner portions to form an enclosing housing. Finally, the arrows G relate to a gap which may exist between the support vanes 19 and the adjacent panel, and such gap may vary between 0 and about 0.02", depending upon the desired application. The offset distance A, as previously defined, should not be greater than the distance between the face and base plates as represented by the arrows C, as the structural integrity of the housing would be greatly diminished.

Figure 12:
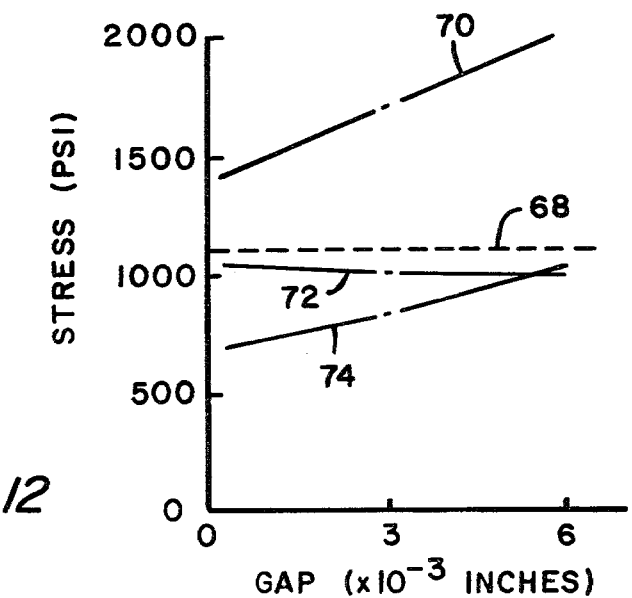
FIG. 12 is a graph illustrating the improved stress distribution obtained by employing the structure of the present invention.

Referring now to the graph of FIG. 12, maximum stress levels vs. different assembly tolerances are set forth for different wall designs. The data is based upon the utilization of soda lime glass panels of approximately $\theta''$ thick, with the skew sidewall contours being defined by the mathematical functions set forth in FIGS. 10 and 11. The horizontal dash line 68 designates the commercially acceptable maximum stress design limit that is normally associated with soda lime glass of 1100 psi maximum stress, whereas the gap refers to the distance G shown in FIG 9. The upper line 70 of the graph designates the stress exhibited by a standard perpendicular sidewall of the prior art, and ranges from about 1400 psi to over 2000 psi, or considerably above the design limit of 1100 psi normally associated with soda lime glass. The center graph line 72 represents the stress exhibited by a unitary contoured skew sidewall such as shown in FIG. 6 having an offset distance A of 7/16. The graph line 72 extends from about 1050 psi down to about 1000 psi, or well within the designated safe limit. Finally, the lower graph line 74 represents a unitary skew sidewall such as shown in FIG. 5 having an offset distance A of $\frac{3}{4}''$, and exhibiting a stress level of from about 675 psi to 1025 psi, or again well within the safe design limit normally associated with soda lime glass.

From the foregoing it can be seen that the skew sidewall structures of the present invention function to materially reduce the maximum stress generated within an evacuated glass bulb or housing for use as a solar collector or a flat panel display, so that safe structural designs within expected production tolerances may be produced. Each of the skew sidewall embodiments has its own specific advantages, with the uniform skew sidewall of course being easier to manufacture and process, however the contoured skew sidewall appears to be more insensitive to assembly tolerances, and accordingly families of such wall configurations can be utilized which incorporate all system constraints as suggested hereinbefore. Thus, although the now preferred embodiments of the invention have been set forth, it will be apparent to those skilled in the art that various changes and modifications may be made thereto without departing from the spirit and scope thereof as defined in the appended claims.

I claim:

1. In an enclosing housing structure having opposed vitreous front and back panels joined together by a plurality of separate vitreous sidewall panels wherein the structure is subjected to a subatmospheric or evacuated environment and must withstand the forces generated thereon by atmospheric pressure when the interior thereof is so evacuated, the improvement comprising separate vitreous sidewall means extending between said opposed front and back panels for altering the stress distribution within said structure from that obtained with perpendicular sidewalls and for maintaining the maximum stress levels generated within such panels by atmospheric pressure to within commercially safe acceptable stress limits, said sidewall means including a plurality of skew glass sidewall panels formed separately of said opposed panels and having outer end portions terminating adjacent opposed surfaces of said opposed front and back panels, adjacent sidewall panels being sealed to each other, said skew sidewall panels being hermetically sealed at their outer ends to surface portions of said opposed front and back panels inwardly of the periphery of said opposed panels, and said skew sidewall panels having an outer portion which is offset within a plane perpendicular to at least a portion of one of said opposed panels with respect to a line lying within such plane and passing through the hermetic seal formed at said sealed ends.

2. An enclosing housing structure as defined in claim 1 wherein said skew glass sidewall panels includes a plurality of oblique sidewall panel portions on each side of said housing, one of said sidewall panel portions being secured at one end to one of said opposed panels inwardly of the periphery thereof, another of said oblique sidewall panel portions being secured at one end to the other of said opposed panels inwardly of the periphery thereof, said one and said another sidewall portions extending outwardly from their secured end away from a central portion of said housing structure and toward one another, said oblique sidewall panel portions being of substantially uniform thickness between said front and back panels and being formed of a plurality of individual panel portions which are hermetically sealed together adjacent end portions thereof intermediate said opposed panels.

3. An enclosing housing structure as defined in claim 1 wherein said separate sidewall means includes a skew sidewall structure of uniform thickness extending between said front and back panels, said uniform sidewall structure including a plurality of oblique panel portions extending from said opposed panels toward one another and slanting outwardly with respect to a central portion of said housing structure, and said uniform skew sidewall structure including a separate unitary sidewall structure formed of said plurality of oblique panel portions for each peripheral edge portion of said opposed panels.

4. An enclosing housing structure as defined in claim 1 wherein said separate sidewall means includes a contoured skew sidewall structure of varying thickness extending between said front and back panels, said contoured sidewall structure including a plurality of oblique contoured panel portions extending between said opposed panels outwardly with respect to a central portion of said housing structure, and said oblique contoured panel portions being thicker adjacent each of said opposed panels and thinner centrally between said opposed panels.

5. An enclosing housing structure as defined in claim 4 wherein said contour skew sidewall is composed of a plurality of individual contoured oblique panel portions which are hermetically sealed together adjacent end portions thereof centrally of said opposed front and back panels.

6. An enclosing housing structure as defined in claim 1 wherein said separate sidewall means includes a skew sidewall structure comprising a plurality of oblique panel portions which lie oblique to said opposed front and back panels and at least one perpendicular panel portion intermediate said oblique panel portions which lies perpendicularly to said opposed panels.

7. An enclosing housing structure as defined in claim 6 wherein an oblique panel portion is sealed at one end to said front panel and another oblique panel portion is sealed at one end of said back panel, said skew sidewall formed by said sidewall panels having an outermost perpendicular panel portion which is outwardly offset within a plane extending perpendicular to said opposed panels from a line lying within said plane and extending through the seal junctures of said one and said other oblique panels with said opposed panels.

8. An enclosing housing structure as defined in claim 1 wherein said separate sidewall means includes a plurality of skew sidewall panels which are asymetric with respect to a plane bisecting the distance between said opposed front and back panels.

* * * * *

UNITED STATES PATENT AND TRADEMARK OFFICE
CERTIFICATE OF CORRECTION

PATENT NO. : 4,312,457
DATED : January 26, 1982
INVENTOR(S) : Roger A. Allaire

It is certified that error appears in the above-identified patent and that said Letters Patent are hereby corrected as shown below:

In the "ABSTRACT", last line, "fornt" should be --front--.

Column 3, line 49, after "of" insert --glass or--.

Column 5, line 62, after "posed" insert --panels--.

Column 6, line 13, " θ" " should be --1/4"--.

Signed and Sealed this

Twenty-first Day of December 1982

[SEAL]

Attest:

*Attesting Officer*

GERALD J. MOSSINGHOFF
*Commissioner of Patents and Trademarks*